July 8, 1941.  H. W. RUSSELL  2,248,909
HEAT TRANSFER DEVICE
Filed April 8, 1940
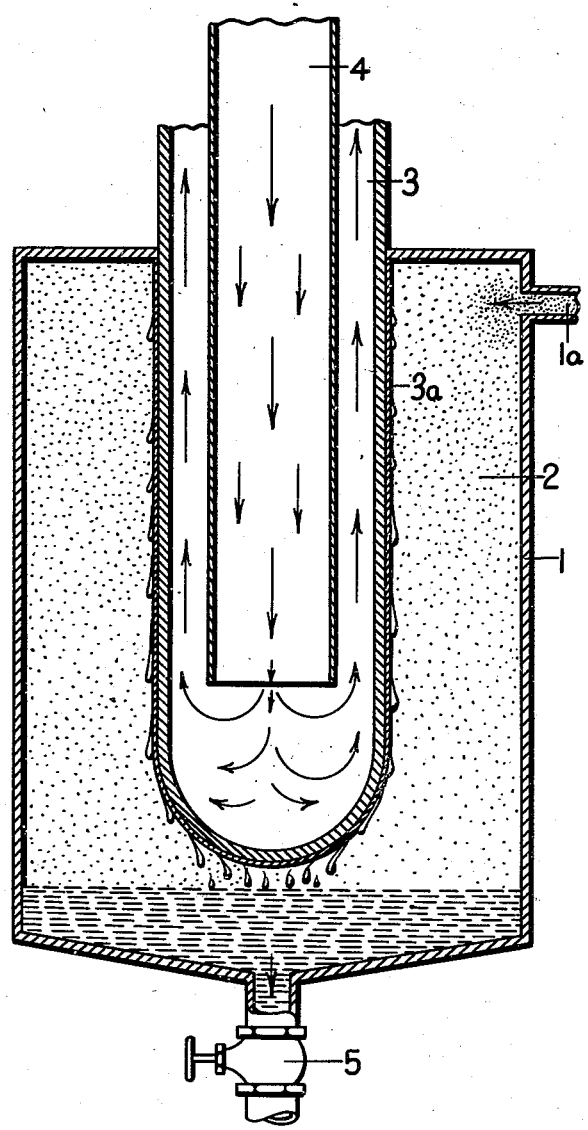
INVENTOR
Howard W. Russell.
BY
*Corbett & Maloney*
ATTORNEYS Patented July 8, 1941

2,248,909

UNITED STATES PATENT OFFICE 2,248,909

HEAT TRANSFER DEVICE

Howard W. Russell, Columbus, Ohio, assignor, by mesne assignments, to Foote Mineral Company, Philadelphia, Pa., a corporation of Pennsylvania Application April 8, 1940, Serial No. 328,411

3 Claims. (Cl. 257—28)

My invention relates to heat transfer devices. It has to do particularly with those types of devices in which heat is removed from a condensing vapor by a cooling fluid and in which the vapor and fluid are separated by a wall which prevents physical mixing or contact of the two.

In the prior art, it has been known that condensation of a vapor upon a heat transferring surface may occur in two ways. In one way, the vapor condenses in such a manner that the condensed liquid forms a continuous liquid film over the whole heat transferring surface, while in the other method the condensate forms discrete drops upon the surface. These methods of vapor condensation are well known and the first is commonly called "film-type" condensation, while the latter is known as "drop-wise" condensation.

It has been shown in the prior art that the drop-wise method of condensation results in much less thermal resistance than the film-type method. Thus, the attainment of a drop-wise condensation results in a decrease in the total thermal resistance of a heat-transferring wall and the rate of heat transfer may be greatly increased under otherwise standard conditions, if drop-wise condensation can be maintained at one surface instead of the film-type. For example, Nagle, Bays, Blenderman and Drew ("Heat Transfer Coefficients During Drop-Wise Condensation of Steam," Trans. A. I. Ch. E. vol. 31, #4, Dec. 1935 pp. 593–604 found that the rate of heat transfer to a given surface from steam might be increased as much as 20 times if drop-wise condensation could be maintained instead of film-type condensation.

One explanation suggested for the better results obtained with drop-wise condensation is that the drops of condensed liquid do not cover the entire metal surface and there is little or no film to retard heat flow at these uncovered sections, while in film-type condensation the whole heat transfer surface is covered with a liquid film. Another possible explanation is that drop-wise condensation results in an increase in the effective surface area of the heat transferring surface due to the irregularities in the surface presented by the droplets of condensate. Film-type condensation, of course, does not cause this increase in effective surface. However, I do not wish to be limited by either of these explanations but merely offer them as theories which may help to account for the known superiority in rate of heat transfer by drop-wise condensation in distinction to film-type condensation.

Regardless of the various theories advanced, it is believed to be well established that it is extremely desirable to promote drop-wise condensation in any heat transfer device where heat is removed from a condensing vapor. It has been suggested in the prior art that drop-wise condensation may be induced by coating the heat transfer surface with a material which renders the surface non-wettable by the condensing vapor, such coating consisting of fatty acids, organic compounds or the like. However, it is difficult to maintain such films or coatings on the heat transfer surface during prolonged use and, in some cases, frequent renewal of this film is required to maintain drop-wise condensation conditions. Such a procedure is undesirable when the condensing liquid must be protected from contamination.

It has also been suggested that highly polished surfaces promote drop-wise condensation. However, it appears that such drop-wise condensation as has been obtained with highly polished surfaces results from contaminants on the highly polished surfaces. Thus, Drew, Nagle and Smith ("The Conditions for the Drop-Wise Condensation of Steam," Trans. A. I. Ch. E. vol. 31, No. 4, December 1935, pp. 605–621) found that even highly polished surfaces gave film-type condensation when absolutely clean if the steam used was also free of contaminants. This observation appears logical since it is known that chemically clean surfaces are easily wetted by a uniform film of liquid. In addition, although smooth surfaces may promote drop-wise condensation, it is difficult to maintain such surfaces under continued use, particularly where corrosive conditions are encountered.

One of the objects of this invention is to greatly reduce the surface required for the transfer of a given amount of heat under given conditions, so that a saving in weight of material and space required for accomplishing the given result may be attained.

Another object of this invention is the provision of a heat transfer surface with which a maximum rate of heat transfer may be obtained with a wide variety of condensing vapors.

Another object of this invention is to provide a heat transfer surface which will promote drop-wise condensation continuously with a wide variety of condensing vapors.

The commonly accepted theory of the mechanism of heat transfer indicates that the transfer of heat from a condensing vapor to a cooling fluid through an interposed heat transferring wall is dependent upon the rate at which heat is transferred per unit of surface area and per unit of temperature difference, in accordance with the following factors:

1. The thermal resistance of a thin film on the condensing vapor side of the heat transferring wall.
2. The thermal resistance of the heat transferring wall.
3. The thermal resistance of a thin film on the cooling fluid side of the heat transferring wall.

It is then apparent that the rate of heat flow under such conditions is controlled by the heat transfer wall and conditions at either surface of this wall. In practically all cases where metal is used for a heat transferring wall, the thermal resistance of the wall itself is of minor importance and the two surface films are the major factors which control the thermal transfer. It therefore becomes of great importance to reduce the thermal resistance of these films to as low a value as possible. This invention is particularly concerned with the reduction of the thermal resistance on the condensing vapor side of the heat transferring wall.

My invention may be used in any heat transfer device in which heat is abstracted from a vapor through a heat transferring wall and subsequently removed from the wall by a suitable cooling fluid, either liquid or gaseous. To realize the full benefits of my invention, the conditions must be such that the vapor is condensed upon the heat transferring wall. Specific devices in which my improved heat transfer surface may be used are heat exchangers, evaporators, condensers, tubular heaters, tempering coils, et cetera.

I have found that when elemental metallic zirconium is used as the vapor condensing surface in heat transfer devices, drop-wise condensation can be maintained under unfavorable conditions which, with most other metals, would result in film-type condensation. This property is characteristics of zirconium surfaces and is not destroyed by continued use. It is obvious that the zirconium may be applied as a surface coating to other materials and the value of my invention still realized, for the benefits are entirely due to the character of the zirconium surface which is not easily wet and promotes drop-wise condensation. Furthermore, zirconium alloys in which the alloying element or elements have no serious detrimental effects upon this drop-wise condensation inducing property of zirconium are equally applicable for use in my invention. While this specific drop-wise condensation inducing property is rare among the metals, it is known that tantalum also possesses this property to a certain extent. However, tests made in the course of investigating this property in zirconium indicated that, under some conditions, zirconium is considerably superior to tantalum for the purpose of inducing drop-wise condensation.

In order to illustrate the advantages of my zirconium coating in comparison with other condensing surfaces, I have maintained polished condensing surfaces of copper and zirconium above a boiling bath of 5% $HNO_3$, 10% HCl and the balance water. Vapors from such a bath tend to promote film-type condensation but although the copper surface produced film-type condensation almost immediately, the zirconium surface maintained drop-wise condensation. Other trials have shown that zirconium heat transfer surfaces specifically promote drop-wise condensation of vapors and that this is a function of the zirconium surface.

One embodiment of my invention is shown in the accompanying drawing. In this drawing, the figure is a diagrammatic illustration of an apparatus which may be utilized to perform the function of my invention. However, it will be understood that this is merely illustrative and that many other types of apparatus may be utilized.

In this figure, the numeral 1 designates a chamber which contains a condsensable vapor 2 introduced through inlet 1a while the numeral 3 indicates a heat transfer tube with a surface 3a exposed to the vapor 2, this surface 3a being composed of zirconium. Cooling water or other fluid is introduced through tube 4 and exits through tube 3 as shown. Vapors coming into contact with the cooled zirconium surface are condensed in a drop-wise manner as indicated in the drawing, and the heat is eventually removed by means of the cooling fluid. The drops collected on the zirconium surface gravitate to the bottom of chamber 1 and the condensed vapors may be removed through the valve-outlet 5. Obviously, other vapors and other coolants may be used in the place of those which have been mentioned.

It will be seen from the above that I have provided a simple and efficacious means which brings about the transfer of heat through a given area of wall at greatly increased and overall efficiency of the wall or heat transferring surface. It will likewise be seen that I have provided a means to greatly reduce the surface required for the transfer of a given amount of heat under given conditions, so that a material saving in the weight of material and space required for accomplishing the desired result may be attained. It will likewise be apparent that I have provided a heat transfer surface with which a maximum rate of heat transfer may be obtained with a wide variety of condensing vapors.

Having thus described my invention, what I claim is:

1. A heat transfer device comprising a wall, means for introducing a cooling fluid upon one side of said wall and means for introducing a condensable vapor on the other side of said wall, the surface of said wall which is in contact with said vapor being formed of chemically clean zirconium.

2. A heat transfer device comprising a wall having a coating of chemically clean zirconium on one side thereof, means for introducing a condensable vapor on that side of the wall which is coated with zirconium and means for introducing a cooling fluid on the opposite side of said wall.

3. A heat transfer device in which a condensing vapor is separated from a cooling fluid comprising a wall for separating the cooling fluid from the condensing vapor, said wall having a chemically clean zirconium surface to which the condensable vapor is to be applied.

HOWARD W. RUSSELL.